July 15, 1958     T. D. PROCTOR     2,843,360
WRECKER FRAME ATTACHMENT
Filed Nov. 15, 1954     2 Sheets-Sheet 1
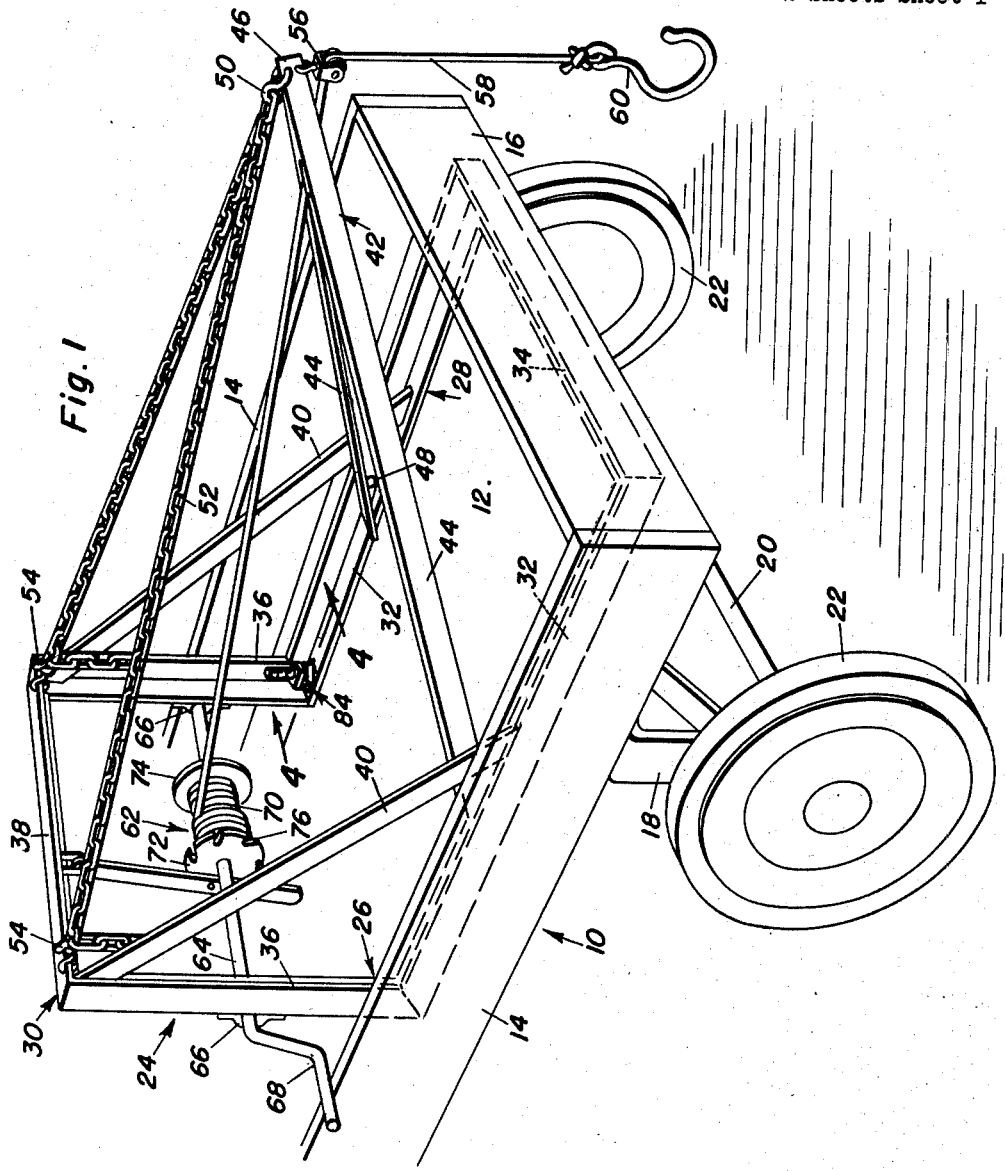
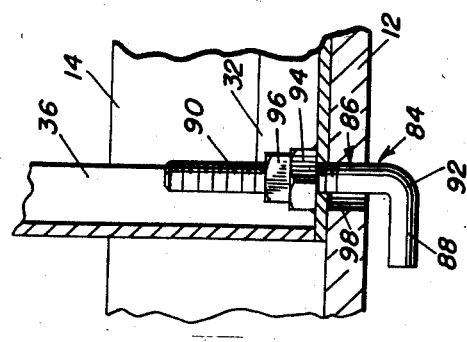
Thomas D. Proctor
INVENTOR.

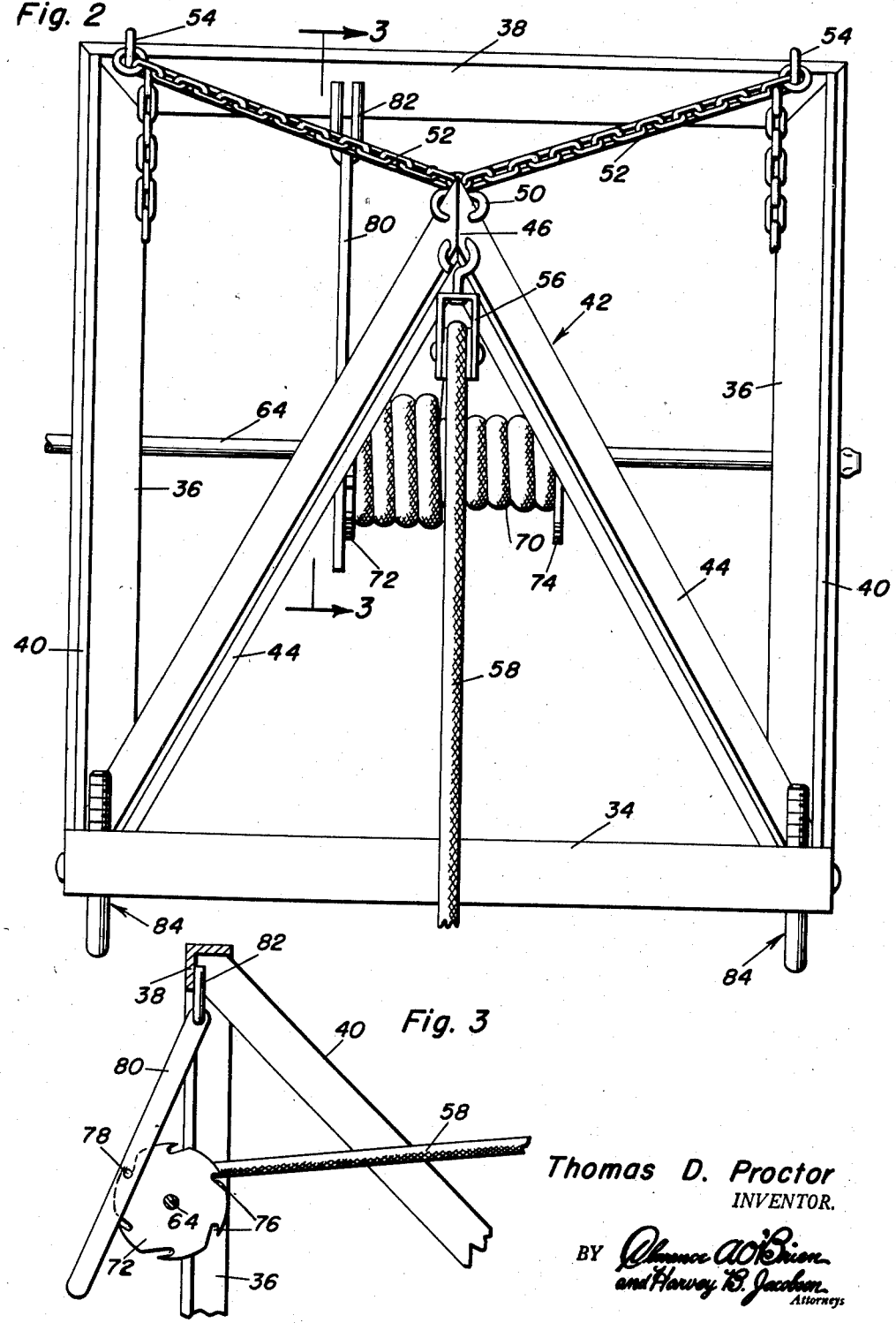

2,843,360
WRECKER FRAME ATTACHMENT
Thomas D. Proctor, Cheboygan, Mich.

Application November 15, 1954, Serial No. 468,837

1 Claim. (Cl. 254—139.1)

This invention relates in general to new and useful improvements in children's toys and more specifically to a wrecker frame attachment for a child's wagon.

Quite often when children are at play with their wagons and other toys, it is enjoyable to the children to have wrecks with their toys and to pretend that one of the toys is a wrecker. It is therefore the primary object of this invention to provide an improved wrecker attachment which may be easily mounted in a wagon to convert a wagon into a wrecker for use in combination with other toys.

Another object of this invention is to provide a wrecker frame attachment for a child's wagon, the wrecker frame attachment being of such size and construction whereby it may be easily positioned in the rear portion of a child's wagon with sufficient room for the proper manipulation of the wrecker attachment.

A further object of this invention is to provide novel fastening means for securing a frame of a wrecker attachment to the bottom of a child's wagon, the connection being of such a nature whereby a wrecker attachment may be quickly and easily attached to and removed from a wagon.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a fragmentary perspective view of the rear portion of a child's wagon and shows mounted therein the wrecker attachment which is the subject of this invention;

Figure 2 is an enlarged rear elevational view of the wrecker attachment showing the same removed from a wagon and illustrating the various details thereof;

Figure 3 is an enlarged fragmentary vertical sectional view taken substantially upon the plane indicated by the section line 3—3 of Figure 2 and shows the details of the winch means of the wrecker attachment; and Figure 4 is an enlarged fragmentary vertical sectional view taken substantially upon the plane indicated by the section line 4—4 of Figure 1, and shows the details of the fastening means for removably securing the wrecker attachment to the bottom of a wagon.

Referring now to the drawings in detail, it will be seen that there is best illustrated in Figure 1 a rear portion of a conventional type of child's wagon which is referred to in general by the reference numeral 10. The child's wagon 10 includes a bottom 12 which has extending upwardly from the sides thereof longitudinally extending side walls 14. The rear ends of the side walls 14 are connected together by a rear wall 16. Supporting the rear portion of the wagon 10 is an axle assembly which includes mounting brackets 18, and axle 20 and suitable wheels 22.

Removably seated in the rear portion of the wagon 10 for converting the wagon into a wrecker is the wrecker attachment which is the subject of this invention, the wrecker attachment being referred to in general by the reference numeral 24. The wrecker attachment 24 includes a frame which is referred to in general by the reference numeral 26.

The frame 26 of the wrecker attachment 24 is formed of a base, which is referred to in general by the reference numeral 28, and an upright, which is referred to in general by the reference numeral 30. The base 28 is generally U-shaped in outline and includes a pair of longitudinal frame members 32 connected together at their rear ends by a transverse frame member 34. The frame members 32 and 34 are angle-shaped in cross-section and are suitably connected together at their abutting ends.

The upright 30 is also of a U-shaped outline and is in an inverted position. The upright 30 includes a pair of vertical legs 36 which are connected together at their upper ends by a transverse member 38. The legs 36 and the member 38 are formed of angle material and are suitably secured together at their abutting ends. It is to be noted that the legs 36 are in abutting engagement with the forward ends of the frame members 32 and are suitably secured thereto. The upright 30 is braced relative to the base 28 by suitable angle braces 40 which extend between the legs 36 and the frame members 32.

The wrecker attachment 24 also includes a boom which is referred to in general by the reference numeral 42. The boom 42 is formed of a pair of rearwardly converging members 44 which are connected together, as at 46. The members 44 are of angle cross-section and are pivotally connected to the frame members 32 by suitable pivot pins 48.

In order that the rear end of the boom 42 may be selectively vertically adjusted, there is provided at the rear ends of the members 44 adjacent their intersection 46 an eye 50. The eye 50 has connected thereto flexible members in the form of chains 52. The chains 52 extend forwardly from the eye 50 and are adjustably connected to the frame member 38 through means of hooks 54 carried thereby.

Connected to the rear end of the boom 42 and depending therefrom is a pulley assembly 56. Entrained over the pulley assembly 56 is a lifting cable 58 which is provided at its lower end with a suitable hook 60. The forward end of the lifting cable 58 is reeled on a winch which is referred to in general by the reference numeral 62.

The winch 62 includes a transverse shaft 64 which is suitably journaled in pillow blocks 66 carried by the legs 36. In order to facilitate turning of the shaft 64, one end thereof is bent to form a crank 68.

The winch 62 includes a drum 70. The drum is provided with a pair of end plates 72 and 74 for retaining the flexible cable 58 on a central spool portion of the drum 70. The end plate 72 is provided with a plurality of notches 76 in which is selectively received a retaining pin 78, as is best illustrated in Figure 3. The retaining pin 78 is carried by an arm 80 pivotally connected to the frame member 38 by a suitable hanger 82. The arm 80 is so positioned relative to the end plate 72 that the pin 78 is continuously urged into one of the notches 76.

Referring now to Figure 4 in particular, it will be seen that the frame 26 is removably secured to the bottom 12 of the wagon 10 by a fastener which is referred to in general by the reference numeral 84. The fastener 84 includes an L-shaped member which is referred to in general by the reference numeral 86. The L-shaped member 86 includes a lower horizontal leg 88 and a vertical leg 90. The legs 88 and 90 are connected together by a curved intermediate portion 92.

The upper portion of the leg 90 is threaded and is threadedly engaged in a nut 94 secured to an associated one of the frame members 32. The member is vertically adjustable with respect to the frame member 32 by rotating the leg 90 in and out of the nut 94. A locking nut 96 is carried on the leg 90 in jammed engagement with the nut 94 to retain the member in a fixed position.

Formed in the bottom 12 in alignment with the member is an enlarged aperture 98. The aperture 98 is of a size to permit the passage of the curved portion 92 of the lower leg 88 upon the forward tipping of the frame 26. In this manner, the wrecker attachment 24 may be quickly and easily positioned with respect to the wagon 10, as well as quickly removed therefrom. At the same time, the two fasteners 86, there being one fastener 86 for each of the frame members 32, serve to retain the wrecker frame in place because of the tendency of the weight of the wrecker frame as well as the weight of any load imposed thereon to hold the rear part of the wrecker frame down against the bottom 12 so as to prevent pivoting thereof to a released position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In combination with a child's wagon, a wrecker attachment comprising an elongated frame seated in said wagon, a boom, said frame having pivotally connected to a forward portion thereof said boom, pulley means at an outer end of said boom, a lifting member entrained over said pulley means, winch means carried by the forward portion of said frame, said lifting member being reeled on said winch means, fastening means carried by the forward portion only of said frame securing said frame to said wagon bottom, said fastening means including at least one L-shaped member carried by said frame and having a lower leg, said L-shaped member including a vertical leg joined to said lower leg by a curved portion, an enlarged opening in said wagon bottom, said member having said vertical leg disposed in said opening with said curved portion and said lower leg passed through said opening with said lower leg underlying said wagon body, said curved portion, said lower leg and said opening being of relative proportions whereby said lower leg and said curved portion may be passed through said opening by tipping said frame.

References Cited in the file of this patent
UNITED STATES PATENTS

| | | |
|---|---|---|
| 1,551,132 | Butler | Aug. 25, 1925 |
| 1,734,343 | Prentice | Nov. 5, 1929 |
| 1,958,497 | Rivers | May 15, 1934 |
| 2,045,793 | Pearson et al. | June 30, 1936 |
| 2,111,341 | Tetrault | Mar. 15, 1938 |
| 2,190,258 | Colorigh | Feb. 13, 1940 |
| 2,491,357 | Ashton | Dec. 13, 1949 |
| 2,497,379 | Vandergrift et al. | Feb. 14, 1950 |
| 2,636,717 | Powers | Apr. 28, 1953 |